US012699284B2

(12) United States Patent
Wu et al.

(10) Patent No.: US 12,699,284 B2
(45) Date of Patent: Aug. 4, 2026

(54) HEAD-MOUNTED DISPLAY DEVICE AND CONTACT LENS USED THEREIN

(71) Applicant: HTC Corporation, Taoyuan City (TW)

(72) Inventors: Chun-Yih Wu, Taoyuan City (TW);
Ta-Chun Pu, Taoyuan City (TW);
Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 761 days.

(21) Appl. No.: 18/163,873

(22) Filed: Feb. 3, 2023

(65) Prior Publication Data

US 2024/0264468 A1 Aug. 8, 2024

(51) Int. Cl.
*G02C 7/04* (2006.01)
*G02B 27/01* (2006.01)

(52) U.S. Cl.
CPC ......... *G02C 7/049* (2013.01); *G02B 27/0172* (2013.01); *G02C 2202/12* (2013.01)

(58) Field of Classification Search
CPC .. G02B 27/017; G02B 27/0172; G02C 7/049; G02C 7/04
See application file for complete search history.

(56) References Cited

U.S. PATENT DOCUMENTS

| | | | | |
|---|---|---|---|---|
| 5,130,857 | A | * | 7/1992 | Gupta .................. G11B 7/1353 |
| 2004/0233533 | A1 | * | 11/2004 | Tanaka ................. G11B 7/1353 |
| | | | | 359/569 |
| 2013/0077044 | A1 | * | 3/2013 | de Juan, Jr. ........... G02C 7/024 |
| | | | | 351/159.04 |
| 2018/0173009 | A1 | * | 6/2018 | Knox ........................ A61F 9/00 |

FOREIGN PATENT DOCUMENTS

CN          109116577 A  *  1/2019  .............. G02C 7/04

* cited by examiner

*Primary Examiner* — Alexander P Gross
(74) *Attorney, Agent, or Firm* — JCIPRNET

(57) ABSTRACT
A contact lens, suitable for a head-mounted display device, includes a first optical structure layer, a second optical structure layer and a third optical structure layer. The first optical structure layer receives an optical signal, wherein the first optical structure layer is divided into a plurality of partitions, and the partitions respectively have a plurality of structural bodies with different structures, and the structural bodies receive the optical signal and generate a plurality of imported optical signals. The second optical structure layer and the first optical structure layer are overlapped, and configured to transmit the imported optical signals to the third optical structure layer. The third optical structure layer and the second optical structure layer are overlapped, and configured to transmit the imported optical signals to a target area.

14 Claims, 6 Drawing Sheets

HEAD-MOUNTED DISPLAY DEVICE AND CONTACT LENS USED THEREIN

BACKGROUND

Technical Field

The invention relates to a head-mounted display device and contact lens, and in particular, to a head-mounted display device and contact lens with multiple optical structure layers used therein.

Description of Related Art

For various head-mounted display devices of virtual reality (VR) and augmented reality (AR), the field of view (FOV) of the display is the main factor affecting the sense of immersion and visual effects. Displays can use eye tracking to increase the field of view. However, the existing eye tracking technology only tracks the relative movement of the eye, and the effect of expanding the field of view is limited.

SUMMARY

The invention provides a head-mounted display device and contact lens thereof, which can effectively expand the range of sight displayed.

The contact lens of the invention includes a first optical structure layer and a second optical structure layer. The first optical structure layer receives an optical signal, wherein the first optical structure layer is divided into a plurality of partitions. The partitions respectively have a plurality of structural bodies with different structures. The structural bodies receive the optical signal and generate a plurality of imported optical signals. The second optical structure layer and the first optical structure layer are overlapped, and configured to transmit the imported optical signals to a target area.

The head-mounted display device of the invention includes an image projector and a contact lens. The image projector is configured to project an optical signal according to a projecting direction. The contact lens is set on an eyeball of a user, wherein a normal direction of the contact lens forms an incident angle with the projection direction. The contact lens includes a first optical structure layer and a second optical structure layer. The first optical structure layer receives the optical signal, wherein the first optical structure layer is divided into a plurality of partitions. The partitions respectively have a plurality of structural bodies with different structures. The structural bodies receive the optical signal and generate a plurality of imported optical signals. The second optical structure layer and the first optical structure layer are overlapped, and configured to transmit the imported optical signals to a target area.

Based on above, in the head-mounted display device of the invention, the structural bodies with different structures are formed in multiple different partitions of the contact lens, and different dispersion capabilities are provided by the structural bodies with different structures. Since the contact lens can receive optical signals at different positions, the displayed field of view can be further expanded.

Although the present invention has been disclosed as above with embodiments, it is not intended to limit the present invention, any person with ordinary knowledge in the technical field, without departing from the spirit and scope of the present invention, can make some changes.

Therefore, the protection scope of the present invention shall be determined by the scope of the claims.

DESCRIPTION OF THE EMBODIMENTS

Figure 1:
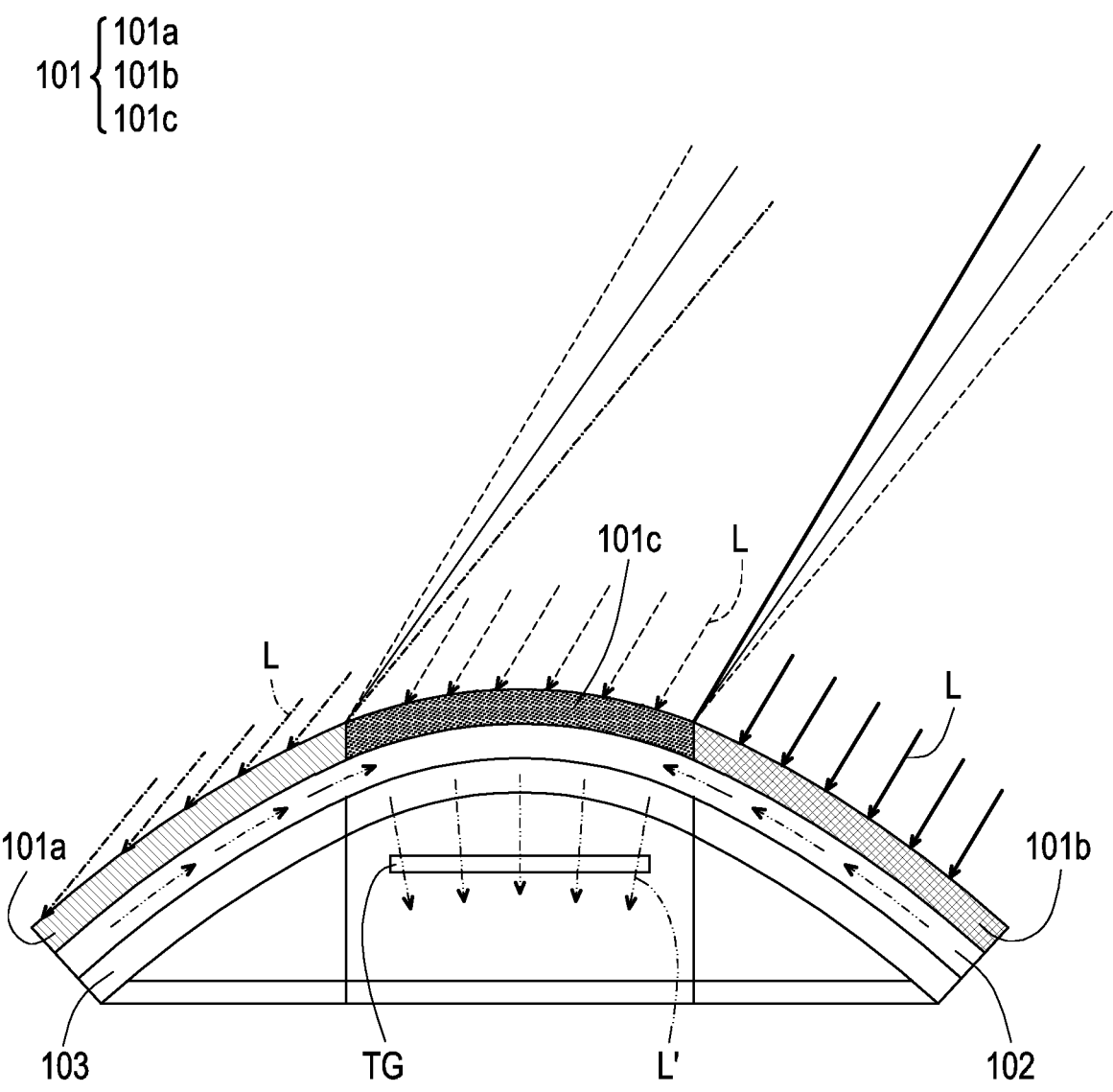
FIG. 1 is a schematic diagram of a contact lens according to an embodiment of the present invention.

FIG. 1 is a schematic diagram of a contact lens according to an embodiment of the present invention. The contact lens 100 of FIG. 1 is suitable for a head-mounted display device, which includes a first optical structure layer 101, a second optical structure layer 102 and a third optical structure layer 103. The first optical structure layer 101 is located on an outer layer of the contact lens 100, and can be divided into a plurality of partitions 101a, 101b, 101c. The partitions 101a, 101b, 101c respectively have structural bodies with different structures. Each of the structural bodies can be composed of multiple continuous periodic concave-convex structures. The periodic concave-convex structure of the structural bodies is used to form the grating. The contact lens 100 is configured to receive an optical signal L externally projected to the contact lens 100, and the optical signal L may have different incident angles with each partitions 101a, 101b, 101c. In the embodiment, the optical signal L can be transmitted by an image projector in the head-mounted display device, and the image projector can be set at a fixed position in the head-mounted display device.

In the embodiment, the structural bodies on each partitions 101a, 101b, and 101c can be set according to the corresponding incident angles. Wherein, the partitions 101a, 101b, 101c respectively have different dispersion capabilities corresponding to different incident angles. Accordingly, when the contact lens 100 moves according to the user's eyeballs, no matter what the incident angle of the optical signal L corresponding to the partitions 101a, 101b, 101c is, the contact lens 100 can effectively generate an imported optical signal L' according to the optical signal L, effectively improving the displayed field of view.

In detail, the partition 101c can be a central partition, and is disposed between the partition 101a and the partition 101b. The contact lens 100 receives the optical signal L through the periodic concave-convex structures on different partitions 101a~101c in the first optical structure layer 101, and generates multiple imported optical signal L' respectively.

The second optical structure layer 102 is located in the middle layer of the contact lens 100 and overlapped with the first optical structure layer 101. The second optical structure layer 102 can be a light guide structure for receiving the imported optical signal L', concentrating the imported optical signal L', and sending it to the third optical structure layer 103.

The third optical structure layer 103 is located in the inner layer of the contact lens 100 and overlapped with the second optical structure layer 102. That is to say, the second optical structure layer 102 is disposed between the first optical structure layer 101 and the third optical structure layer 103. The third optical structure layer 103 is another grating layer. The third optical structure layer 103 can be attached to an eyeball E of a user, and transmits a plurality of the imported optical signals L' to a target area TG. The target area TG can be a pupil area of the eyeball E of the user.

Incidentally, the dispersion capability of each of the partitions 101a, 101b, 101c may also depend on the shape of its structural bodies, substrate thickness, material parameters, filling ratio of materials, or different dispersion relations achieved by two different materials.

Figure 2A:
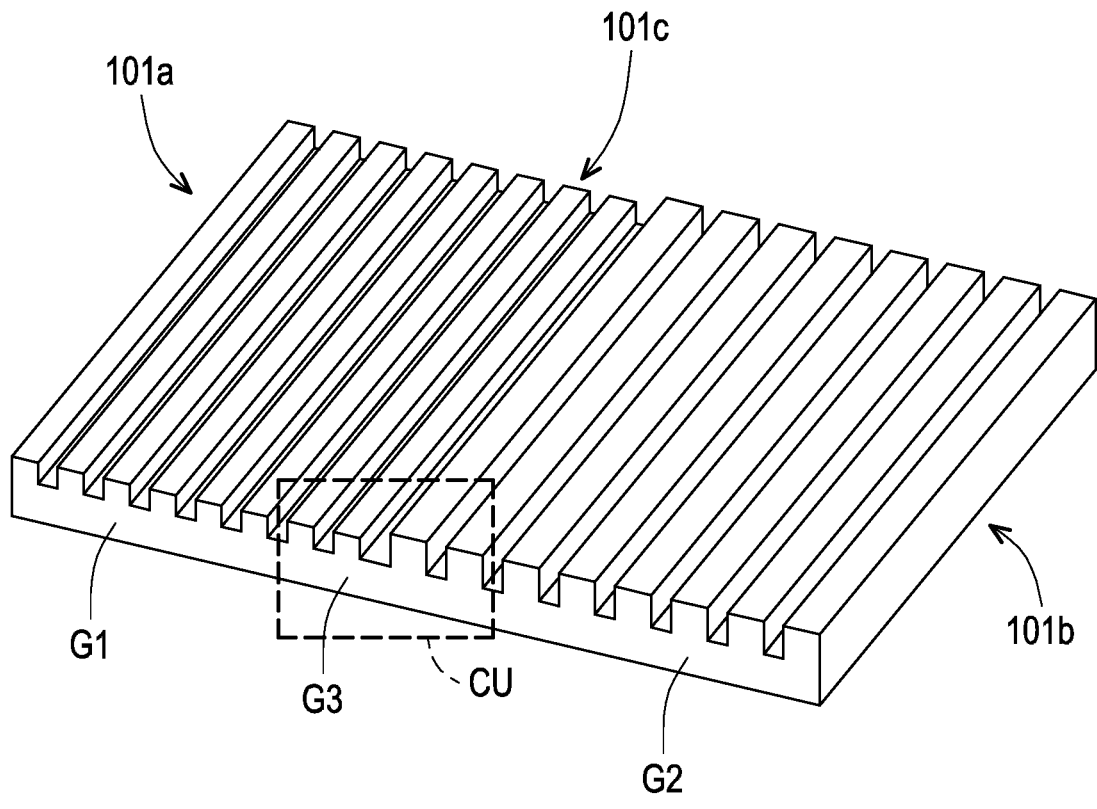
FIG. 2A is a schematic diagram of a structural body of a contact lens according to an embodiment of the present invention.
Figure 2B:
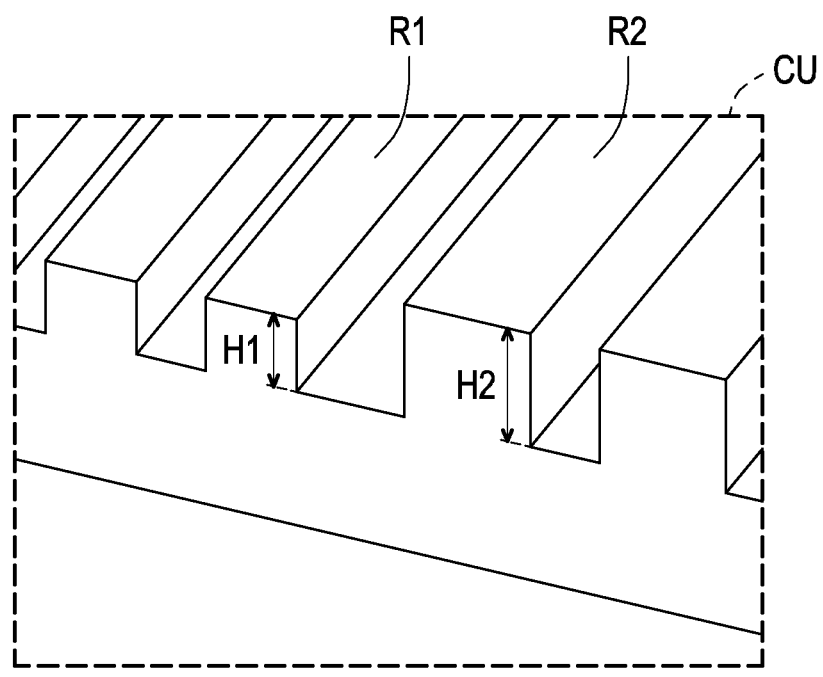
FIG. 2B is a partial enlarged view of the structural body in FIG. 2A.
Figure 2C:
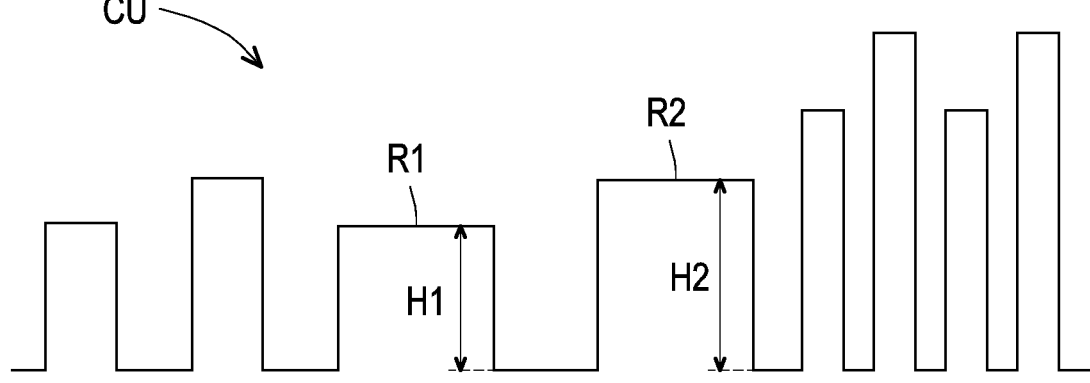
FIG. 2C is a cross-sectional view of FIG. 2B.

FIG. 2A is a schematic diagram of a structural body of a contact lens according to an embodiment of the present invention. As shown in FIG. 2A, the first optical structure layer 101 is divided into a partition 101a, a partition 101b and a central partition 101c between the partition 101a and the partition 101b. The partition 101a, partition 101b and the central partition 101c respectively have a structural body G1, a structural body G2 and a structural body G3 of different architectures. The structural body G1, structural body G2 and structural body G3 can be periodic structures composed of square structures of single or composite units. In the embodiment, the structural body G1, structural body G2 and structural body G3 can be composed of multiple continuous periodic concave-convex structures, and the periodic concave-convex structures here are square structures CU with unequal heights. FIG. 2B is a partial enlarged view of the structural body in FIG. 2A. As shown in FIG. 2B, square blocks R1 and R2 in the square structure CU have different heights H1 and H2 respectively. FIG. 2C is a cross-sectional view of FIG. 2B. As shown in FIG. 2C, in addition to the square blocks R1 and R2 in the CU, other square blocks with different lengths and widths are also included and arranged at different intervals. Besides, in the unit length, the number of the square structure CU in the structural body G1, structural body G2 and structural body G3 is not equal. In this way, the periodic structure composed of different heights and different numbers of square structure CU in the structural body G1, structural body G2 and structural body G3 makes the corresponding partition 101a, partition 101b and the central partition 101c present different dispersion capabilities corresponding to different incident angles of the optical signal L. It should be noted that, in other embodiments, the periodic concave-convex structure may be a structure of other shapes, for example, a periodic concave-convex structure with different numbers and amplitudes of periodic waveforms per unit length.

Figure 3A:
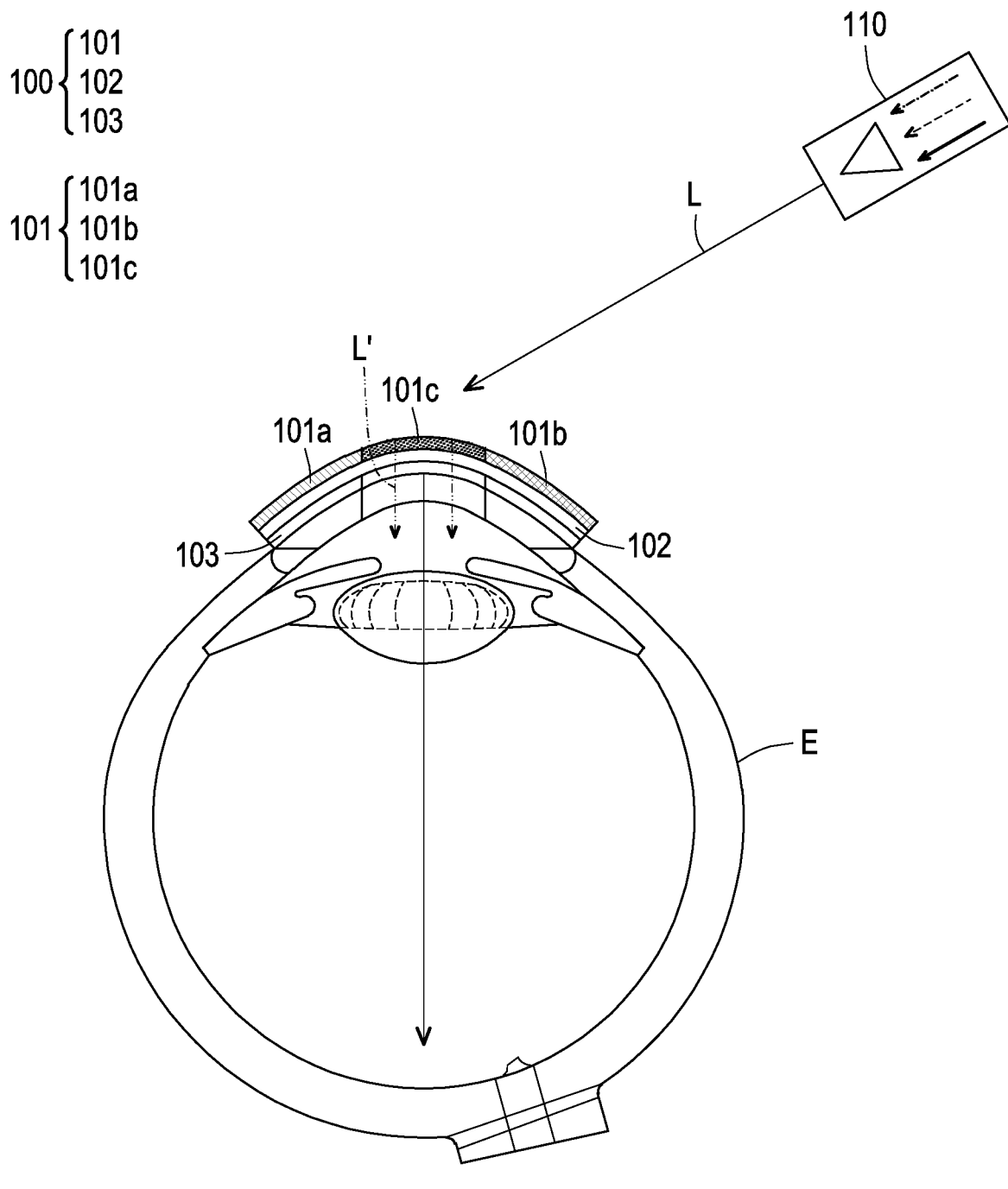
FIG. 3A to FIG. 3C are schematic diagrams of a head-mounted display device under different incident angles according to an embodiment of the present invention.
Figure 3B:
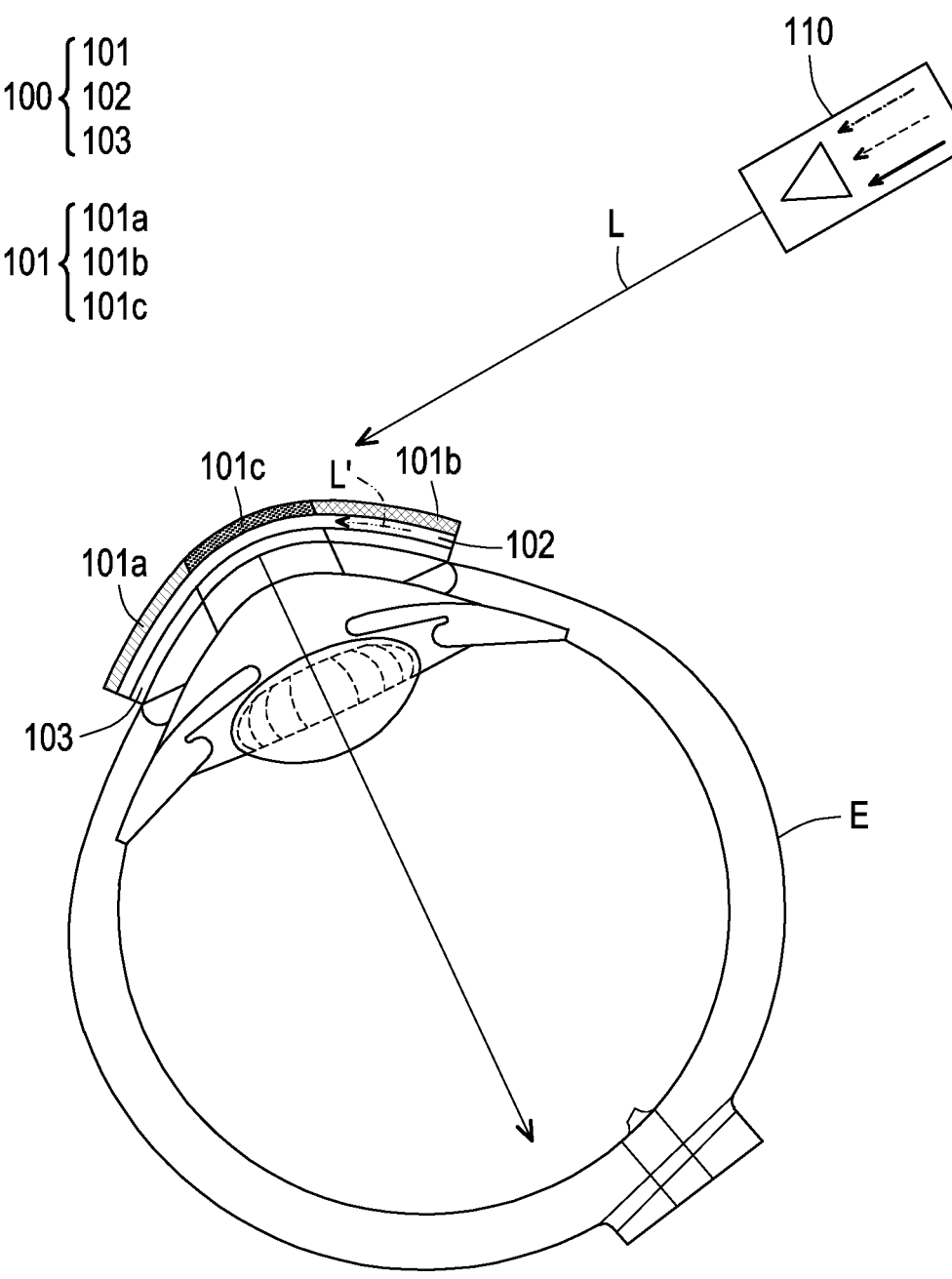
Figure 3C:
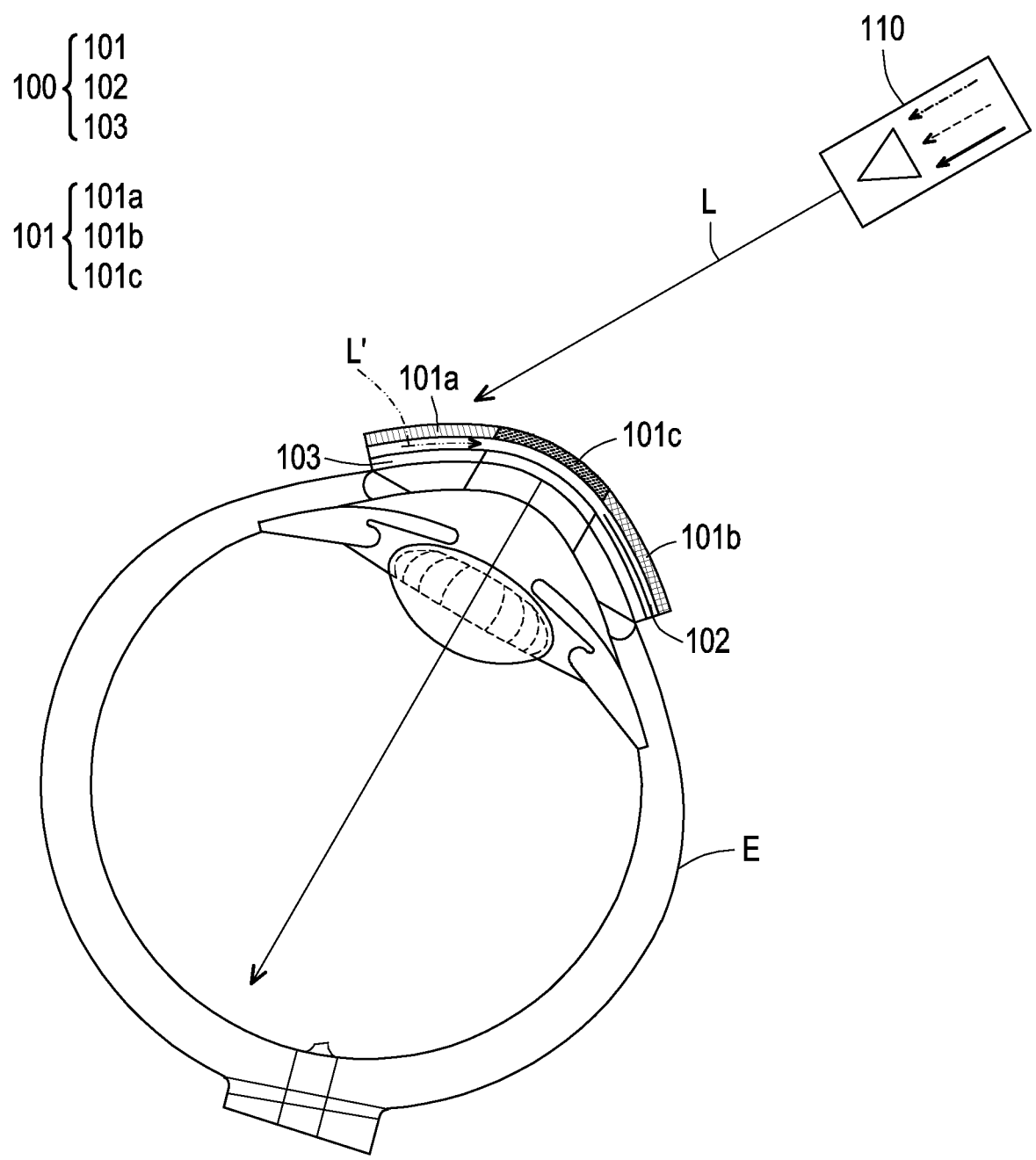

FIG. 3A to FIG. 3C are schematic diagrams of a head-mounted display device 200 under different incident angles according to an embodiment of the present invention. As shown in FIG. 3A~3C, the head-mounted display device 200 includes the contact lens 100 and the image projector 110. The image projector 110 projects the optical signal L according to the projection direction. The contact lens 100 is set on the eyeball E of the user, wherein the normal direction of each partition 101a, 101b, 101c on the first optical structure layer 101 of the contact lens 100 forms different incident angles with the projection direction of the optical signal L respectively. When the user's eyeball E turns to different directions, the above-mentioned different incident angles also change accordingly.

As shown in FIG. 3A, the projection direction of the optical signal L is mainly focused on the central partition 101c of the first optical structure layer 101 and the periodic structure composed of a single or compound unit in the third structural body G3 of the central partition 101c will produce a corresponding dispersion result. As mentioned above, the first optical structure layer 101 imports the imported optical signal of the dispersion result to the second optical structure layer 102, the second optical structure layer 102 concentrates multiple imported optical signals and imports them to the third optical structure layer 103, and the third optical structure layer 103 transmits multiple imported optical signals to the pupil area of the eyeball E of the user.

As shown in FIG. 3B, the projection direction of the optical signal L is mainly focused on the second partition 101b of the first optical structure layer 101, and the periodic structure composed of a single or compound unit in the second structural body G2 of the second partition 101b will produce a corresponding dispersion result. As mentioned above, the first optical structure layer 101 imports the imported optical signal of the dispersion result to the second optical structure layer 102 in the direction of the central partition 101c, the second optical structure layer 102 concentrates multiple imported optical signals and imports them to the third optical structure layer 103, and the third optical structure layer 103 transmits multiple imported optical signals to the pupil area of the eyeball E of the user.

As shown in FIG. 3C, the projection direction of the optical signal L is mainly focused on the first partition 101a of the first optical structure layer 101, and the periodic structure composed of a single or compound unit in the first structural body G1 of the first partition 101a will produce a corresponding dispersion result. As mentioned above, the first optical structure layer 101 imports the imported optical signal of the dispersion result to the second optical structure layer 102 in the direction of the central partition 101c, the second optical structure layer 102 concentrates multiple imported optical signals and imports them to the third optical structure layer 103, and the third optical structure layer 103 transmits multiple imported optical signals to the pupil area of the eyeball E of the user.

In this way, when the eyeball E of the user wearing the contact lens 100 turns to different directions such as FIG. 3A~3C, the optical signal with a fixed projection direction can be introduced to the user's retina without changing the projection direction of the image projector 110. Therefore, the field of view displayed by the head-mounted display device is enlarged.

In summary, in the head-mounted display device of the invention, the structural bodies with different structures are formed in multiple different partitions of the contact lens. And when the user's eyeball turns to different directions, the above-mentioned imported optical signal is introduced into the retinal area of the user's eyeball by different dispersion capabilities provided by the structural bodies with different structures, so as to further expand the displayed field of view.

Although the present invention has been disclosed as above with embodiments, it is not intended to limit the present invention, any person with ordinary knowledge in the technical field, without departing from the spirit and scope of the present invention, can make some changes. Therefore, the protection scope of the present invention shall be determined by the scope of the claims.

What is claimed is:

1. A contact lens, suitable for a head-mounted display device, comprising:

a first optical structure layer, configured to receive an optical signal, wherein the first optical structure layer is divided into a plurality of partitions, and the partitions respectively have a plurality of structural bodies with different structures, and the structural bodies receive the optical signal and generate a plurality of imported optical signals; and a second optical structure layer, overlapped with the first optical structure layer, configured to transmit the imported optical signals to a target area, wherein each of the partitions is directly disposed on the second optical structure layer.

2. The contact lens according to claim 1, wherein the partitions comprises a first partition, a second partition and a central partition, the structural bodies comprises a first structural body, a second structural body and a third structural body corresponding to the first partition, the second partition and the central partition, wherein the central partition is located between the first partition and the second partition.

3. The contact lens according to claim 2, wherein the first structural body, the second structural body and the third structural body each include a continuous plurality of square structures, in a unit length, the numbers of the square structures in the first structural body, the second structural body and the third structural body are not equal.

4. The contact lens according to claim 3, wherein in the first structural body, the second structural body and the third structural body, the heights of the square structures are not equal.

5. The contact lens according to claim 1, wherein the structural bodies provide different light refraction angles respectively.

6. The contact lens according to claim 1, further comprises:

a third optical structure layer, overlapped with the second optical structure layer, configured to fit with an eyeball of a user, wherein the second optical structure layer is disposed between the first optical structure layer and the third optical structure layer.

7. The contact lens according to claim 6, wherein the target area is a pupil area of the eyeball of the user.

8. A head-mounted display device, comprising:

an image projector, configured to project an optical signal according to a projecting direction; and a contact lens, set on an eyeball of a user, wherein a normal direction of the contact lens forms an incident angle with the projection direction, the contact lens comprises:

a first optical structure layer, configured to receive the optical signal, wherein the first optical structure layer is divided into a plurality of partitions, and the partitions respectively have a plurality of structural bodies with different structures, and the structural bodies receive the optical signal and generate a plurality of imported optical signals; and a second optical structure layer, overlapped with the first optical structure layer, configured to transmit the imported optical signals to a target area, wherein each of the partitions is directly disposed on the second optical structure layer.

9. The head-mounted display device according to claim 8, wherein the partitions comprises a first partition, a second partition and a central partition, the structural bodies comprises a first structural body, a second structural body and a third structural body corresponding to the first partition, the second partition and the central partition, wherein the central partition is located between the first partition and the second partition.

10. The head-mounted display device according to claim 9, wherein the first structural body, the second structural body and the third structural body each include a continuous plurality of square structures, in a unit length, the numbers of the square structures in the first structural body, the second structural body and the third structural body are not equal.

11. The head-mounted display device according to claim 10, wherein in the first structural body, the second structural body and the third structural body, the heights of the square structures are not equal.

12. The head-mounted display device according to claim 8, wherein the structural bodies provide different light refraction angles respectively.

13. The head-mounted display device according to claim 8, wherein the contact lens further comprises:

a third optical structure layer, overlapped with the second optical structure layer, configured to fit with the eyeball of the user, wherein the second optical structure layer is disposed between the first optical structure layer and the third optical structure layer.

14. The head-mounted display device according to claim 13, wherein the target area is a pupil area of the eyeball of the user.

* * * * *